(12) United States Patent
Schmidt et al.

(10) Patent No.: US 9,318,883 B2
(45) Date of Patent: Apr. 19, 2016

(54) SEALED DOORS, ENCLOSURES, AND METHODS ADAPTED FOR USE WITH ELECTRICAL ARC-PRONE COMPONENTS

(71) Applicant: Siemens Industry, Inc., Alpharetta, GA (US)

(72) Inventors: Bernhard Schmidt, Cary, NC (US); Richard Schulz, Clayton, NC (US); Xiong Pan, Raleigh, NC (US)

(73) Assignee: Siemens Industry, Inc., Alpharetta, GA (US)

( * ) Notice: Subject to any disclaimer, the term of this patent is extended or adjusted under 35 U.S.C. 154(b) by 324 days.

(21) Appl. No.: 13/624,631

(22) Filed: Sep. 21, 2012

(65) Prior Publication Data

US 2013/0320831 A1 Dec. 5, 2013

Related U.S. Application Data

(60) Provisional application No. 61/655,858, filed on Jun. 5, 2012.

(51) Int. Cl.
*H02B 13/025* (2006.01)
*E05C 19/16* (2006.01)
*H02B 1/38* (2006.01)

(52) U.S. Cl.
CPC ............ *H02B 13/025* (2013.01); *E05C 19/161* (2013.01); *H02B 1/38* (2013.01)

(58) Field of Classification Search
CPC .......... E06B 7/16; H02B 13/025; H02B 1/38; H02B 1/28; H01H 9/342
USPC .............. 312/296, 326, 329, 100, 109, 265.3, 312/265.4; 49/496.1, 475.1
See application file for complete search history.

(56) References Cited

U.S. PATENT DOCUMENTS

| | | | | |
|---|---|---|---|---|
| 3,912,348 A | * | 10/1975 | Seymour | 312/100 |
| 4,864,466 A | * | 9/1989 | Gasparetto | 361/605 |
| 5,574,624 A | * | 11/1996 | Rennie et al. | 361/676 |
| 5,689,097 A | * | 11/1997 | Aufermann et al. | 218/157 |
| 6,357,804 B1 | * | 3/2002 | Bernier et al. | 292/114 |
| 6,989,996 B2 | * | 1/2006 | Wells | H02B 1/28 200/293 |
| 7,095,606 B2 | * | 8/2006 | Mahn | H02B 13/025 220/89.1 |
| 7,654,404 B2 | * | 2/2010 | Kadziolka et al. | 220/211 |
| 7,871,137 B2 | * | 1/2011 | Schulz | H02B 1/28 312/296 |
| 7,974,078 B2 | * | 7/2011 | Coomer | H02B 13/025 312/236 |
| 8,842,421 B2 | * | 9/2014 | Gingrich | H01H 33/53 174/17 VA |
| 2003/0117045 A1 | * | 6/2003 | Byron et al. | 312/199 |
| 2003/0151337 A1 | * | 8/2003 | Leccia et al. | 312/326 |
| 2005/0198907 A1 | * | 9/2005 | McKnight et al. | 49/475.1 |
| 2008/0093932 A1 | * | 4/2008 | Whitt et al. | 307/112 |
| 2009/0173118 A1 | * | 7/2009 | Schulz et al. | 70/275 |
| 2010/0218429 A1 | * | 9/2010 | Shanahan et al. | 49/413 |
| 2012/0013227 A1 | * | 1/2012 | Josten et al. | 312/109 |

(Continued)

*Primary Examiner* — Daniel J Troy
*Assistant Examiner* — Ryan A Doyle

(57) ABSTRACT

A sealed enclosure is disclosed. Sealed enclosure has a case configured to receive an arc-prone electrical component, a face frame defining an opening, a door configured to cover the opening, a sealing surface on the face frame or on the door, and one or more flaps having an sealing portion, the sealing portion being angled relative to the sealing surface, the one or more flaps being operational to flex from a disengaged position when not under pressure, to an engaged position in contact with the sealing surface when exposed to pressure inside the case during an arcing event. Sealed enclosure doors and methods of sealing an enclosure during an arcing event are also provided, as are other aspects.

20 Claims, 6 Drawing Sheets

(56) References Cited

U.S. PATENT DOCUMENTS

2012/0028559 A1* 2/2012 Kingston ............... 454/184
2012/0194044 A1* 8/2012 Niedzwiecki ............... 312/215
2013/0087359 A1* 4/2013 Leslie et al. ............... 174/50.5
2013/0143478 A1* 6/2013 Arcos et al. ............... 454/184

* cited by examiner

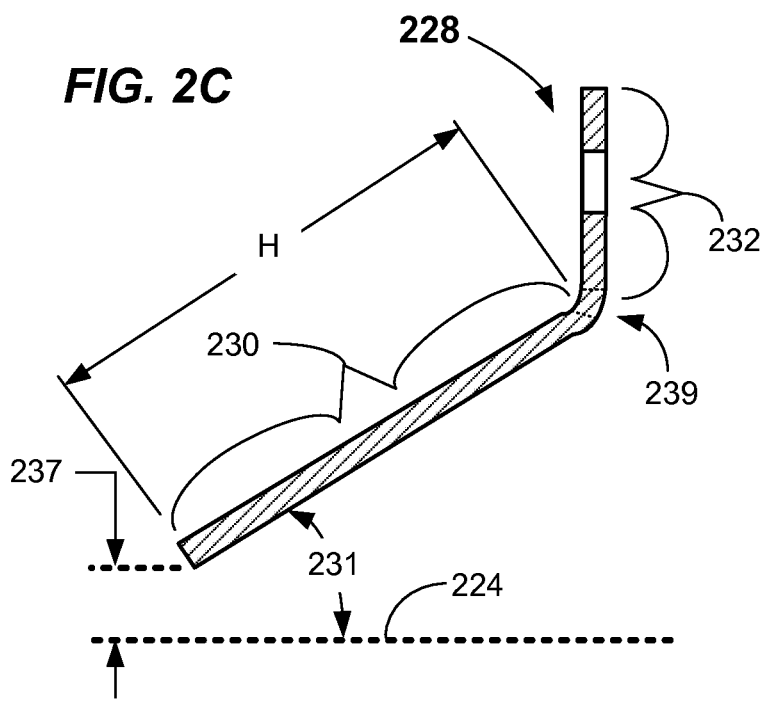
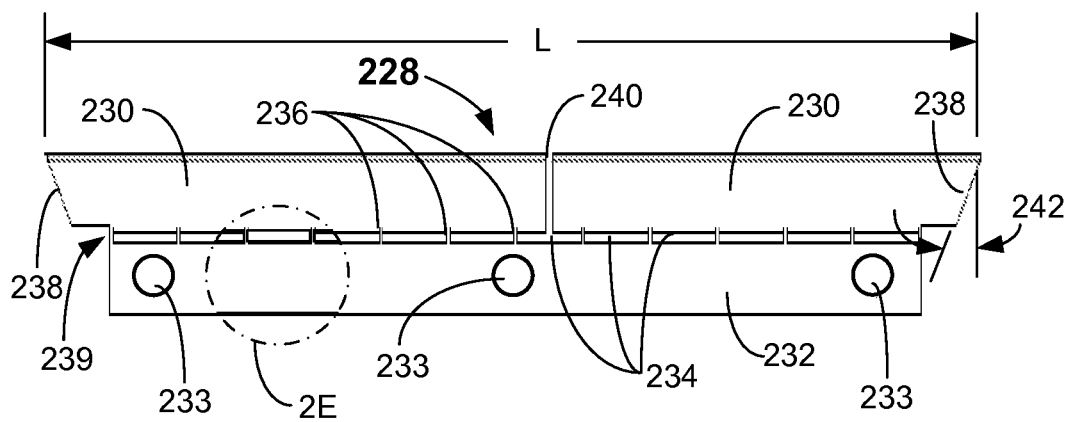

SEALED DOORS, ENCLOSURES, AND METHODS ADAPTED FOR USE WITH ELECTRICAL ARC-PRONE COMPONENTS

RELATED APPLICATIONS

This application claims priority to U.S. Provisional Patent Application Ser. No. 61/655,858 filed on Jun. 5, 2012, entitled "SIMOVAC Enclosure Door Seal," the disclosure of which is hereby incorporated by reference in its entirety herein.

FIELD

The invention relates generally to electrical component enclosures that are adapted to contain arc-producing components.

BACKGROUND

Metal, box-like enclosures are commonly used to contain certain arc-prone electrical components, such as medium-voltage controllers. Such controllers may operate at voltages from about 5 kV to 38 kV. These enclosures are typically designed to withstand increased gas pressures that may be generated during, for example, an arcing event that acts in an interior of the enclosure. Such controller enclosures typically include one or more doors allowing access to an interior of the enclosure thereby providing ease in servicing and maintaining the motor controllers therein. Such enclosure doors are generally designed to limit arcing products and hot gases from escaping the enclosure. To accomplish this, a typical enclosure door may overlap a face frame of an opening of the enclosure when closed. One or more hinges may be provided along a hinged edge of the door. One or more latches that engage the face frame may be provided along edges of the other sides of the door. However, existing doors may be inefficient at containing arcs and arc debris.

Accordingly, improved mechanisms for withstanding arc-induced gas pressures in order to limit arcing products and hot gases from escaping the enclosure (e.g., controller enclosures) are desired.

SUMMARY

According to a first aspect, a sealed enclosure is provided. The sealed enclosure includes a case configured to receive an arc-prone electrical component; a face frame defining an opening; a door configured to cover the opening; a sealing surface on the face frame or on the door; and one or more flaps having an sealing portion, the sealing portion being angled relative to the sealing surface, the one or more flaps being operational to flex from a disengaged position when not under pressure, to an engaged position in contact with the sealing surface when exposed to pressure inside the case during an arcing event.

According to another aspect, a sealed enclosure is provided. The sealed enclosure includes a case configured to receive an arc-prone electrical component; a face frame on the case defining an opening, the face frame having a plurality of sealing surfaces; a door configured to cover the opening; and a plurality of flaps coupled to the door, one flap adjacent each edge of the door, the plurality of flaps each having an sealing portion being positioned relative to one of the sealing surfaces, the one or more flaps being operational to flex from a disengaged position when not under pressure, to an engaged position in contact with the sealing surfaces when exposed to pressure inside the case during an arcing event.

According to a further aspect, a sealed enclosure door is provided. The sealed enclosure door includes a door configured to cover an opening of a case; and a plurality of flaps coupled to the door, one flap adjacent each edge of the door, the plurality of flaps each having an sealing portion, the one or more flaps being operational to flex from a disengaged position when not under pressure, to an engaged position in contact with sealing surfaces of an enclosure when exposed to pressure inside the case during an arcing event.

According to still another aspect, a method of sealing an enclosure during an arcing event is provided. The method includes providing a face frame on a case of the enclosure; providing a door on the case; providing a sealing surface on the door or the face frame; and sealing between the door and the face frame during the arcing event by flexing a flap into contact with the sealing surface responsive to pressure buildup in the enclosure due to the arcing event.

Still other aspects, features, and advantages of the invention may be readily apparent from the following detailed description wherein a number of exemplary embodiments and implementations are described and illustrated, including the best mode contemplated for carrying out the invention. The invention may also be capable of other and different embodiments, and its several details may be modified in various respects, all without departing from the scope of the invention. Accordingly, the drawings and descriptions are to be regarded as illustrative in nature, and not as restrictive. The drawings are not necessarily drawn to scale. The invention covers all modifications, equivalents, and alternatives falling within the scope of the invention.

BRIEF DESCRIPTION OF DRAWINGS

FIG. 2C illustrates a cross-sectioned side view showing a configuration of a flap according to embodiments.

FIG. 2D illustrates a front plan view showing a configuration of a bend line of a flap according to embodiments.

DETAILED DESCRIPTION

Reference will now be made in detail to the example embodiments of this disclosure, which are illustrated in the accompanying drawings. Wherever possible, the same reference numbers will be used throughout the drawings to refer to the same or like parts.

The aforementioned problem of improving the sealing of an enclosure for arc-prone components having a case and a door for closing the enclosure is addressed by one or more embodiments of the invention described herein. Accordingly, by providing improved sealing of the enclosure containing the electrical components that are subject to arcing, embodiments of the present invention help to protect operators from potentially un-safe working conditions and limit the egress of arc debris and gases from the enclosure.

In one or more embodiments, a sealed enclosure is provided having a case configured to receive an arc-prone electrical component, a face frame defining an opening into the case, and a door configured to cover the opening. The face frame or the door has a sealing surface that is contacted by one or more flaps arranged around the opening. The one or more flaps have a sealing portion oriented to be angled relative to the sealing surface, the one or more flaps being operational to flex from a disengaged position when not under pressure, to an engaged position in contact with the sealing surface when exposed to arc pressure (pressure buildup in the case due to electrical arcing of the electrical component contained in an interior of the enclosure) inside the case during an arcing event.

In other aspects, sealed doors are provided, as are methods of sealing an enclosure door during an arcing event, as will be explained in greater detail below in connection with FIGS. 1A-5 herein.

Figure 1A:
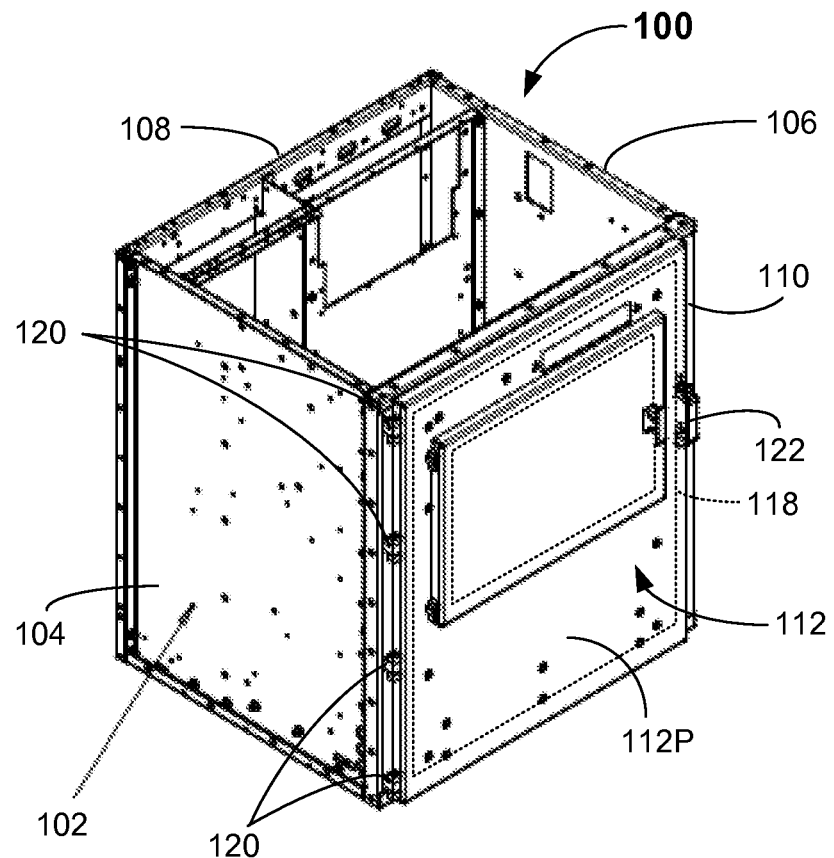
FIG. 1A illustrates a perspective view of a sealed enclosure with the top removed for clarity according to embodiments.
Figure 1B:
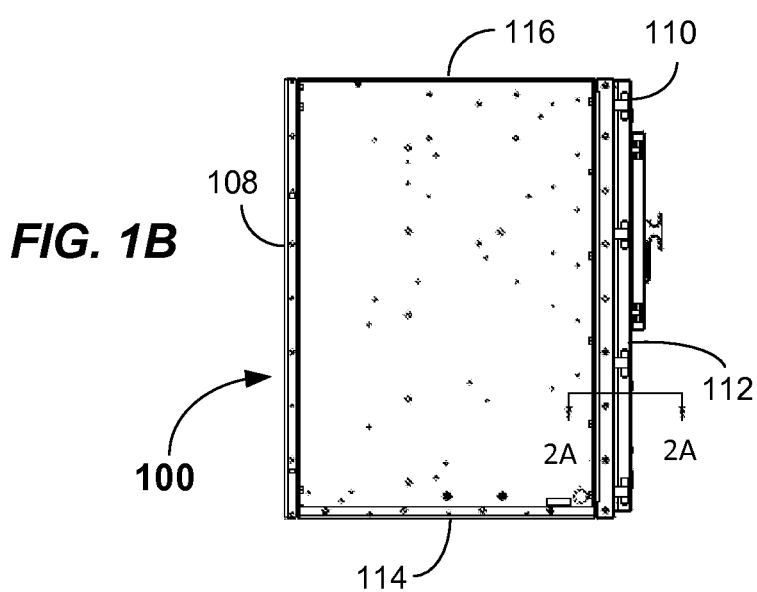
FIG. 1B illustrates a representative side view of a sealed enclosure according to embodiments.

FIGS. 1A and 1B illustrate perspective and side views, respectively, of an enclosure 100 that may be used to house medium and/or light voltage electrical components (not shown) that are prone to arcing (hereinafter "arc-prone components").

Such electrical components may include electrical controllers, such as motor controllers, switchgear, or the like, for example. Such electrical controllers may operate at voltages of from about 5 KV to 38 KV. Other voltage operation levels may be provided. When arcing occurs due to insulation deterioration, vermin damage, or other causes severe electrical arcing may occur. During such arcing events when substantial, violent electrical arcs may be produced within the enclosure 100, pressures within the enclosure 100 may spike very rapidly to relatively high pressures (e.g., 5-40 psi or more). These pressures distort the door and conventional sealing system thereof.

In one or more embodiments, the enclosure 100 includes a case 102 configured to receive an arc-prone electrical component. The case 102 has walls 104, 106, 108, a face frame 110, and a door 112 interfacing with the face frame 110. The enclosure 100 includes a floor 114 and ceiling 116. The floor 114 and ceiling 116 may be assembled to the walls 104, 106 and 108 and face frame 110 as a unit, or in some embodiments, or the floor 114 and ceiling 116 may be provided on components that are then assembled to the case 102. In any event, an enclosed interior space is provided that is adapted to house one or more arc-prone electrical components. According to embodiments, the case 102 has an opening 118 (shown dotted in FIG. 1A) defined by the face frame 110. The door 112 is configured and adapted to selectively cover the opening 118 when closed, and allow access into the interior of the enclosure 100 when opened.

The door 112 may include a door panel 112P and a handle 122 at an outer surface of the door 112. The handle 122 may operate a mechanism (e.g., a closing and/or locking mechanism) at an inner surface of the door 112 for closing the door 112. In some embodiments, a door locking mechanism may be part of a switch interlock system. A door ledge (see door ledge 212L in FIG. 2A) may be provided into or adjacent to a receiver surface 223 (FIG. 2A) on or attached to one or more outer surfaces of the face frame 110 of the case 102. This arrangement, in combination with a one or more hinges 120 on another edge of the door 112, securely latches the door 112 in a closed configuration and seals the same.

Figure 2A:
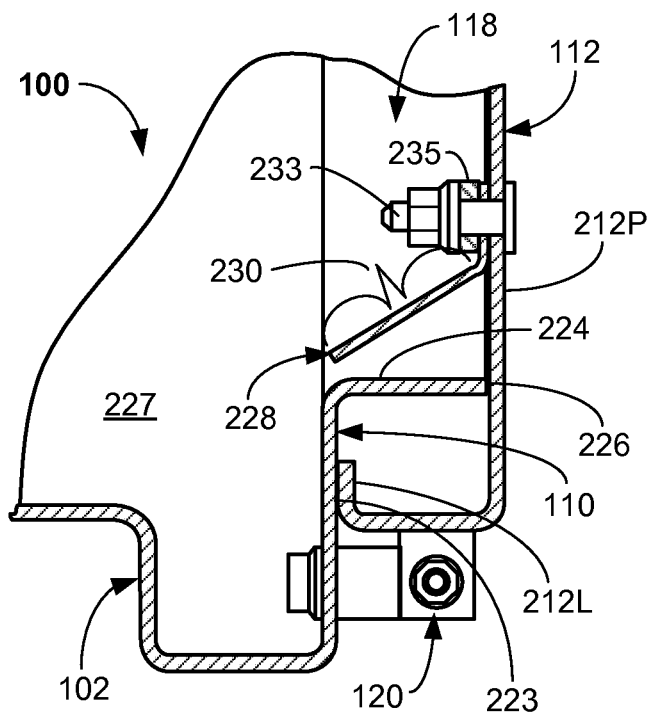
FIG. 2A illustrates a cross-sectioned side view of a sealed enclosure having a flap in an un-sealed condition according to embodiments.
Figure 2B:
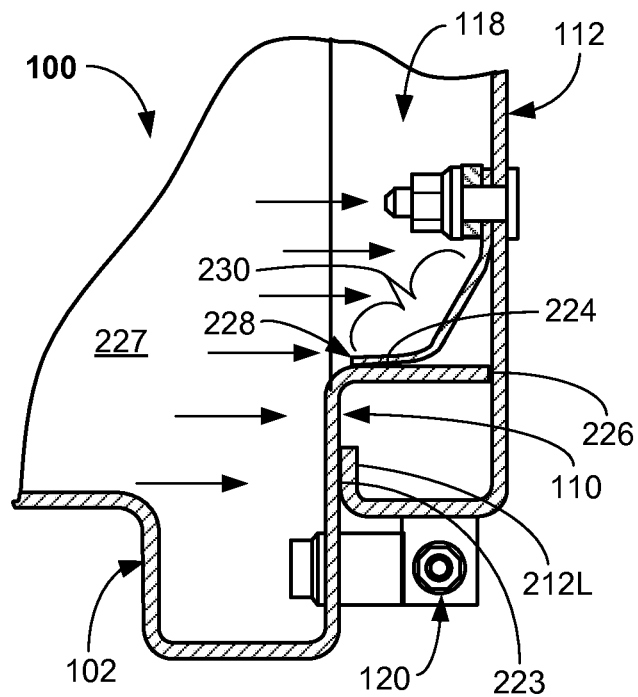
FIG. 2B illustrates a cross-sectioned side view showing the flap in a sealed condition during an arcing event according to embodiments.
Figure 2E:
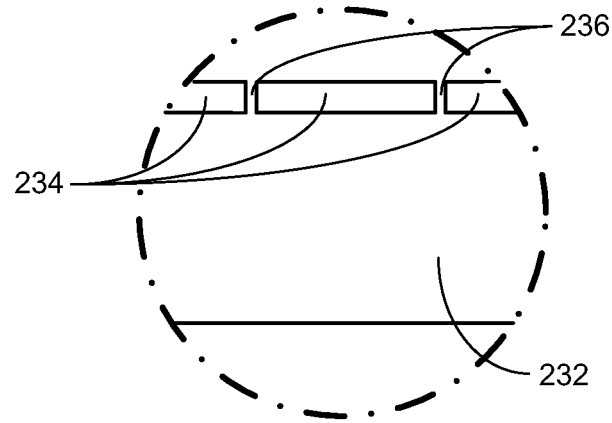
FIG. 2E illustrates an enlarged partial view showing a configuration of a flap according to embodiments.

As depicted in FIGS. 2A and 2B, a portion of the sealed enclosure 100 is shown, and, in particular, a representative cross-section taken along 2A 2A of FIG. 1B is depicted. As shown, the door 112 is hinged to the case 102 by the one or more hinges 120. Any suitable hinge may be used. The door 112 may include a panel 212P which may be planar and have the ledge portion 212L depending from the panel 212P. The ledge portion 212L may be received adjacent to a receiver surface 223 of the face frame 110, as discussed above to provide a first seal. The face frame 110 may include an outwardly projecting portion 226 extending outwardly from the interior 227 and from the receiver surface 223. The outwardly projecting portion 226 may define the opening 118 through which the interior 227 may be accessed in order to service or install various electrical, mechanical or other components in the enclosure 100. Other alternative configurations of the face frame 110 may be used.

In more detail, the sealed enclosure 100 includes a sealing surface 224, which may be provided on the face frame 110. In particular, in this embodiment, the sealing surface 224 is provided on the outwardly projecting portion 226 and comprises one or more planar surfaces. In the embodiment described herein, a planar sealing surface 224 is provided on each of the left, right, top, and bottom portions of the opening 118. The sealed enclosure 100 includes one or more flaps 228 having a sealing portion 230 configured and adapted to seal against the sealing surface 224. In the depicted embodiment, a flap 228L, 228R, 228T, 228B (See FIG. 2F) is provided for sealing each edge or the door 112. The sealing portion 230 may be at the tip of the flap 228 or along a length thereof. The flap 228 is flexible and deformable, and in particular, the flap 228 may be made of a flexible sheet material having a thickness and elastic modulus such that it is deformable to flap responsive to arc pressures (signified by the arrow group) generated within the interior 227 of the enclosure. The flap 228 may be formed from a steel sheet, for example. The sheet may have a thickness of from between about 6 gauge to about 26 gauge in some embodiments, between about 12 gauge to about 18 gauge in some embodiments, and may be about 16 gauge steel sheet in some embodiments. The steel sheet material having a thickness of from 14 gauge to 16 gauge in other embodiments. Other suitable gauges may be used. The deformation is preferably elastic, such that the flaps 228 return to their original undeflected configuration (FIG. 2A) at an end of an arcing event. The sealing portion 230 of the one or more flaps 228 may have a height (H) of between about 15 mm and about 200 mm, a length (L) of between about 0.02 m and about 4 m in some embodiments. In some embodiments, the flaps 228 can be made of a material that will both plastically and elastically deform into contact with the sealing surface 224 and at least partially hold its shape after it is deformed, while elastically relaxing to other than the original shape or configuration. In this manner, a first arcing event may deform the flaps 228 to fit the contours of the face frame 110, while relaxing enough elastically to provide sufficient clearance to allow for opening of the door 112. When deformed fully, a seal is formed by the flaps 228 against the face frame 110 to prevent gases from escaping.

As shown in FIGS. 2C and 2D, a cross-sectional view and plan view, respectively, of the flap 228 is shown. The flap 228 includes an attachment portion 232, which may be attached to the back side 212S of the door 112. The sealing portion 230 is connected to the attachment portion 232. In one or more embodiments, the attachment to the door 112 may be by suitable fasteners, such as fastener 233 (FIG. 2A) and bar strap 235, which may be a steel bar strap material. Bar strap 235 may be secured along an entire length of the attachment portion 232 by the fasteners 234, or one or more portions thereof to provide additional reinforcement. As shown in FIG. 2D, one or both ends of the flaps 228 may include an angled end 238. As shown, the angled ends 238 of the of the one or more flaps 228 may be angled at an angle 242 of less than 90 degrees, and about 10 degrees to about 70 degrees in some embodiments, and between about 30 degrees and about 60 degrees, in other embodiments for example. In some embodiments, the angle 242 may be about 28 degrees. Other angles may be used. A break 240 may be provided along the length of the flap 228 to allow the flap 228 to better seal locally. In another embodiment, the flaps 228 may overlap each other at the corners, or more than one flap 228 may be used per side of the door with each of the flaps 228 having overlapping portions at other than the door corners. In this way, the adjacent flaps 228 may not have a space between them.

Figure 2F:
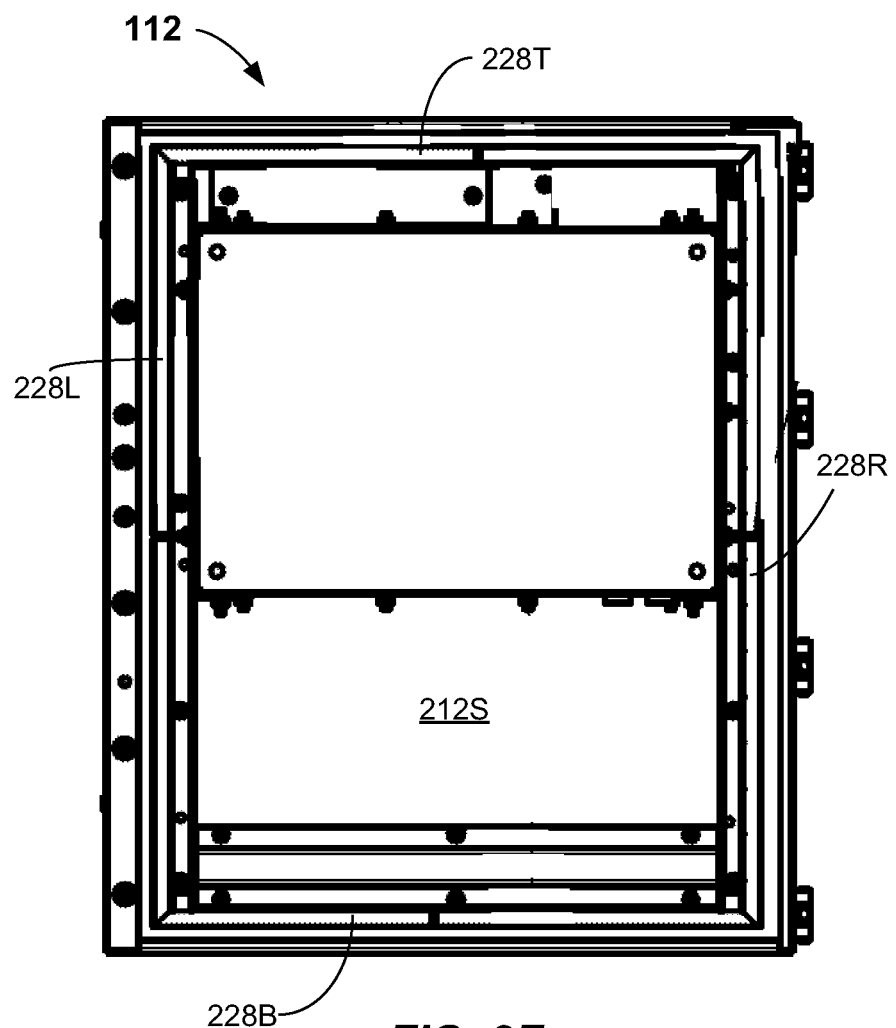
FIG. 2F illustrates a rear plan view of a door having flaps arranged adjacent to the door edges according to embodiments

As shown in FIG. 2F, a door 112 is shown with right, left, top and bottom flaps 228R, 228L, 228T, 228B. The flaps 228R, 228L, 228T, 228B may be provided and configured to traverse around and cover the perimeter of the inner surface 212S of the door 112. However, the flaps 228R, 228L, 228T, 228B may not be continuous. Raps 228R, 228L, 228T, 228B may be of different lengths. Raps 228R, 228L, 228T, 228B may be provided as individual segments along each edge of the door 112 in some embodiments. In other embodiments, more than one flap may be provided per door edge. Because the flaps 238 are not continuous, i.e., they have breaks at the corners and possibly along their lengths, the flaps 228R, 228L, 228T, 228B may deform independently of each other. This allows the flaps 228R, 228L, 228T, 228B to take up and accommodate any tolerance stack-ups from the building of the enclosure 100.

Again referring to FIG. 2D, in one or more embodiments, some material along the bend line 239 (the bending line between sealing portion 230 and attachment portion 232) of the flap 228 may be removed to provide that the force required to bend and deform the flap 228 into contact with the sealing surface 224 is minimized. The thickness of the flaps 228 and amount of material removal may be selected to refine the bending properties such that an expected pressure generated due to an arcing event (e.g., 5-40 psi) may be sufficient to deform the sealing portion 230 of the flap 228 into sealing engagement with the sealing surface 224. As shown in enlarged FIG. 2E, the flap 228 may include pockets 234 interspersed by beam springs 236. In this case, the material removal is considerable and the width of the each pocket 234 being substantially wider than a width of each beam spring 236. Pockets 234 may be about 50 mm wide and about 3 mm tall, as shown. Each beam spring 236 may be about 2.5 mm wide by about 3 mm tall, as shown. Five or more, or even ten or more beam springs 236 may be provided on each flap 228. Other dimensions and numbers of beam springs 236 may be provided. In another embodiment, the material removed along the bend line 239 is substantially greater or less than the present embodiment.

In FIG. 2C, a representative cross-section of a flap 228 is shown. In the depicted embodiment, sealing portion 230 comprises a generally-planar portion that may be angled relative to the sealing surface 224 (shown dotted). Angle 231 may be greater than about 10 degrees in some embodiments, and between about 10 and 70 degrees, and about 60 degrees in some embodiments. Other angles may be used. The one or more flaps 228 are operational to flex and deform from a disengaged position (as shown in FIGS. 2A and 2C) when not under pressure from an arcing event, to an engaged position (FIG. 2B) in contact with the sealing surface 224 when exposed to pressure inside the case 102 during an arcing event. A gap 237 may be provided between the closest portion of the flap 228 and the sealing surface 224. The gap 237 may be less than or equal to about 10 mm. In some embodiments, the gap 237 may be greater than or equal to about 2 mm and less than or equal to about 10 mm. Other gap dimensions may be used.

Figure 3:
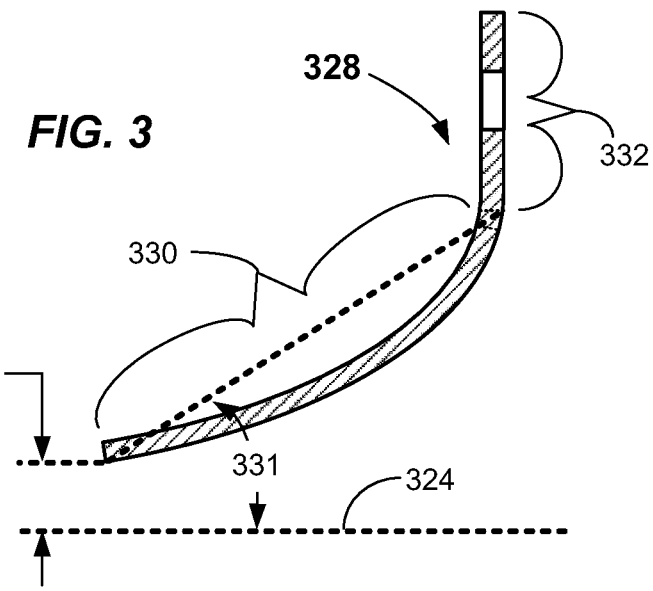
FIG. 3 illustrates a cross-sectioned side view of an alternative flap configuration according to embodiments.

In another embodiment, as best shown in FIG. 3, the one or more flaps 328 may not have a flat sealing portion 230 as in FIG. 2C, but the sealing portion 330 may have a non-straight profile (e.g., a curved profile). Any suitable shape of the sealing portion 330 may be used to seal against the sealing surface 324 when an arcing event occurs. The sealing portion 330 may be considered angled as having an angle 331 between the sealing part of the sealing surface (e.g., the tip) and the attachment point to the door 112 as shown by the angle between the dotted line and the sealing surface 324. The attachment portion 332 may be as previously described. Moreover, a gap 337 may be provided between a closest part of the sealing portion and the sealing surface 324 to allow unimpeded door opening. Gap 337 may be as previously described.

The inventor has recognized that the increased gas pressure generated during an arcing event on the interior 227 of the enclosure 100 may act to outwardly distort the door in prior door designs, thus providing gaps through which arc debris may escape. This is solved by the present invention by effectively sealing the flaps 228 against the sealing surface 224 of the face frame 110. The flaps 228 move from a disengaged position when not under pressure to an engaged position during an arcing event. This motion of the flaps 228 advantageously results in a tighter sealing between the door 112 and the face frame 110, and in some embodiments operates as a second seal in addition to the seal provided by the interaction of the receiver surface 223 and the door ledge 212L.

Figure 4:
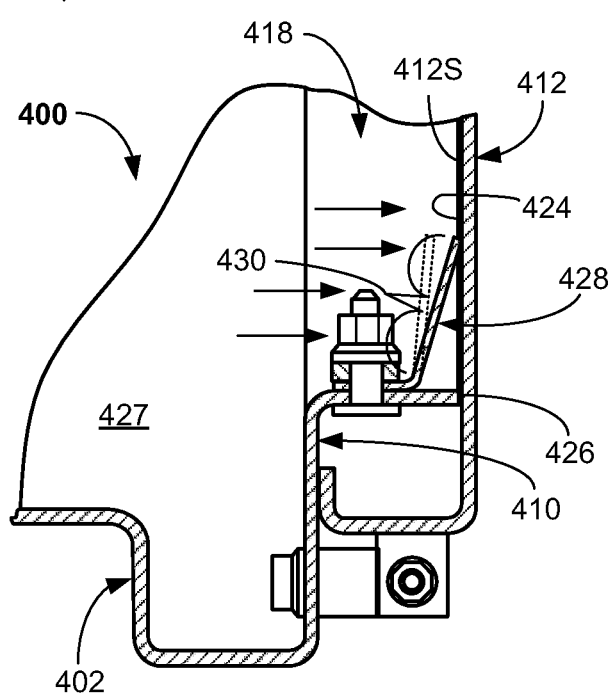
FIG. 4 illustrates a partial, cross-sectioned side view of an alternative sealed enclosure configuration with the flap coupled to a face frame according to embodiments.

In an alternative embodiment of sealed enclosure 400, as shown in FIG. 4, the one or more flaps 428 are shown coupled to the face frame 410 of the case 402, and in particular to an outward projecting portion 426 forming the opening 418. In this embodiment, the sealing portion 430 seals with a sealing surface 424 provided on the backside 412S of the door 412. The door 412 may be as heretofore described. The flap may be identical to the embodiment of FIG. 2C-2D. However other suitable flap structures may be used, such as shown in FIG. 3. The flap 428 in FIG. 4 is operational to flex and deform from a disengaged position (shown dotted) when not under pressure (signified by the arrow group) from an arcing event, to an engaged position as shown in contact with the sealing surface 424 when exposed to pressure inside the interior 427 of the case 402 during an arcing event.

Figure 5:
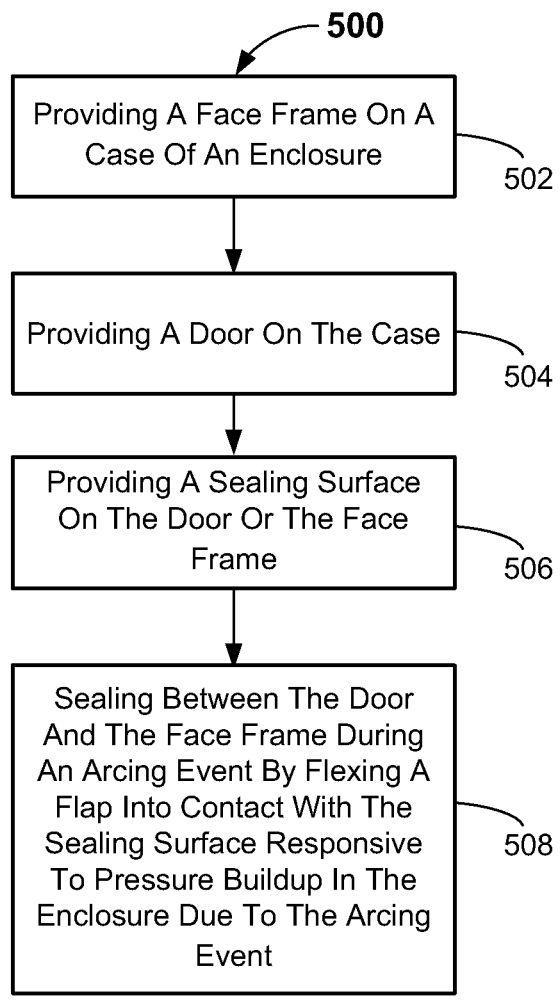
FIG. 5 illustrates a method of sealing an enclosure according to embodiments.

FIG. 5 illustrates a method 500 of sealing an enclosure (e.g., enclosure 100, 400) during an arcing event taking place within the enclosure in accordance with one or more embodiments. Method 500 may include, at process block 502, providing a face frame (e.g., face frame 110, 410) on a case (e.g., case 102, 402) of the enclosure, in process block 504 providing a door (e.g., door 112, 412) on the case, and in process block 506, and providing a sealing surface (e.g., sealing surface 224, 424) on the door or the face frame of the enclosure.

In process block 508, sealing is provided between the door and the face frame during the arcing event by flexing a flap (e.g., flaps 228, 428) into contact with the sealing surface responsive to pressure buildup in the enclosure due to the arcing event.

It should be understood that the above process blocks of method 500 may be executed or performed in an order or sequence not limited to the order and sequence shown and described. Also, some of the above blocks may be executed or performed substantially simultaneously or in parallel where appropriate or desired. For example, in some embodiments, blocks 502, 504 and 506 may be performed in another order or in parallel or substantially simultaneously.

Persons skilled in the art should readily appreciate that the invention described herein is susceptible of broad utility and application. Many embodiments and adaptations of the invention other than those described herein, as well as many variations, modifications, and equivalent arrangements, will be apparent from, or reasonably suggested by, the invention and the foregoing description thereof, without departing from the substance or scope of the invention. For example, although described in connection with motor controller enclosures, the invention may be applicable to other suitable types of electrical enclosures adapted to contain one or more arc-prone electrical components. Accordingly, while the invention has been described herein in detail in relation to specific embodiments, it is to be understood that this disclosure is only illustrative and presents examples of the invention and is made merely for purposes of providing a full and enabling disclosure of the invention. This disclosure is not intended to limit the invention to the particular devices, systems or methods disclosed, but, to the contrary, the intention is to cover all modifications, equivalents, and alternatives falling within the scope of the invention.

What is claimed is:

1. A sealed enclosure, comprising:
    a case configured to receive an arc-prone electrical component;
    a face frame defining an opening in the case;
    a door configured to cover the opening;
    a sealing surface provided on a portion of the face frame or on an edge portion of the door adjacent to the face frame; and
    a plurality of flaps having a sealing portion, the sealing portion angled relative to the sealing surface, the plurality of flaps arranged around the opening and configured to be flexible and deformable and configured and capable of operating to flex from a disengaged position when not under pressure, to an engaged position in contact with the sealing surface when exposed to arcing pressure inside the case during an arcing event so as to seal between the door and the face frame on all edges of the door.

2. The sealed enclosure of claim 1 wherein the plurality of flaps are coupled to the door and the sealing portion seals to the sealing surface on the face frame.

3. The sealed enclosure of claim 1 wherein the plurality of flaps are coupled to the face frame and the sealing portion seals to the sealing surface on the door.

4. The sealed enclosure of claim 1 wherein the plurality of flaps comprise an attachment portion coupled to the sealing portion, the attachment portion adapted to couple to the door or face frame.

5. The sealed enclosure of claim 1 wherein the sealing portion is positioned such that a gap between the sealing portion and the sealing surface is less than or equal to about 10 mm.

6. The sealed enclosure of claim 5 wherein the sealing portion is positioned such that the gap between the sealing portion and the sealing surface is greater than or equal to about 2 mm and less than or equal to about 10 mm.

7. The sealed enclosure of claim 5 wherein the sealing portion is positioned such that an angle between the sealing portion and the sealing surface is between about 10 degrees and about 70 degrees.

8. The sealed enclosure of claim 1 wherein the plurality of flaps comprise a flexible sheet material.

9. The sealed enclosure of claim 1 wherein the plurality of flaps comprise a sheet material having a thickness of from 6 gauge to 26 gauge.

10. The sealed enclosure of claim 1 wherein the plurality of flaps comprise a steel sheet material having a thickness of from 14 gauge to 16 gauge.

11. The sealed enclosure of claim 1 comprising a height of the sealing portion of the plurality of flaps of between about 25 mm and about 50 mm.

12. The sealed enclosure of claim 1 comprising an angle of less than 90 degrees formed on one or more angled ends of one or more of the plurality of flaps.

13. The sealed enclosure of claim 1, comprising an angle of between about 60 degrees and about 30 degrees formed on each angled end of one or more of the plurality of flaps.

14. The sealed enclosure of claim 1, wherein one or more of the plurality of flaps comprise a bend line having a plurality of pockets interspersed with beam springs.

15. A sealed enclosure, comprising:
    a case configured to receive an arc-prone electrical component;
    a face frame on the case defining an opening in the case, the face frame having a plurality of sealing surfaces on portions thereof;
    a door configured to cover the opening; and
    a plurality of flaps coupled to the door, one flap of the plurality of flaps adjacent to each edge of the door, the plurality of flaps each having a sealing portion positioned relative to one of the sealing surfaces at the peripheral portion, the plurality of flaps configured to be flexible and deformable and configured and capable of operating to flex from a disengaged position when not under pressure, to an engaged position in contact with the sealing surfaces when exposed to arcing pressure inside the case during an arcing event so as to seal between the door and the face frame on all edges of the door.

16. The sealed enclosure of claim 15, comprising an angle of less than 90 degrees formed on angled ends of the plurality of flaps.

17. The sealed enclosure of claim 15 wherein each of the sealing portions is positioned such that a gap between each of the sealing portions and the adjacent sealing surface is less than 10 mm.

18. The sealed enclosure of claim 15 wherein the sealing portion is positioned such that an angle of between the sealing portion and the sealing surface is greater than about 30 degrees.

19. A sealed enclosure door, comprising:
    a door configured to cover an opening of a case; and
    a plurality of flaps coupled to the door, one flap of the plurality of flaps positioned adjacent to each edge of the door, the plurality of flaps each having a sealing portion, the plurality of flaps configured to be flexible and deformable and configured and capable of operating to flex from a disengaged position when not under pressure, to an engaged position in contact with sealing surfaces of the case when exposed to arcing pressure inside the case during an arcing event so as to seal between the door and the face frame on all edges of the door.

20. A method of sealing an enclosure during an arcing event, the method comprising:
- providing a face frame on a case of the enclosure, the enclosure including an arc-prone component;
- providing a door on the case;
- providing a sealing surface on a portion of the door or on an edge portion of the face frame;
- providing a plurality of flaps configured to be flexible and deformable; and
- sealing between the door and the face frame on all edges of the door during the arcing event by flexing the plurality of flaps into contact with the sealing surface responsive to arcing pressure buildup in the enclosure due to the arcing event.

\* \* \* \* \*